United States Patent
Yagishita

(10) Patent No.: US 9,417,712 B2
(45) Date of Patent: Aug. 16, 2016

(54) IMAGE PROCESSING APPARATUS, COMPUTER-READABLE RECORDING MEDIUM, AND IMAGE PROCESSING METHOD

(71) Applicant: Takahiro Yagishita, Kanagawa (JP)

(72) Inventor: Takahiro Yagishita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 142 days.

(21) Appl. No.: 13/871,460

(22) Filed: Apr. 26, 2013

(65) Prior Publication Data

US 2013/0307773 A1 Nov. 21, 2013

(30) Foreign Application Priority Data

May 18, 2012 (JP) ................. 2012-114843
Mar. 28, 2013 (JP) ................. 2013-069791

(51) Int. Cl.
*G06F 3/03* (2006.01)
*G06F 3/042* (2006.01)
*H04N 9/31* (2006.01)

(52) U.S. Cl.
CPC ............ *G06F 3/0304* (2013.01); *G06F 3/0425* (2013.01); *H04N 9/3194* (2013.01)

(58) Field of Classification Search
CPC .... G06F 3/0304; G06F 3/0425; H04N 9/3194
See application file for complete search history.

(56) References Cited

U.S. PATENT DOCUMENTS

| 4,875,063 | A | 10/1989 | Idenawa et al. |
| 4,918,489 | A | 4/1990 | Inage et al. |
| 4,977,414 | A | 12/1990 | Shimada et al. |
| 5,019,913 | A | 5/1991 | Kiya et al. |
| 5,107,278 | A | 4/1992 | Shimada et al. |
| 5,491,506 | A | 2/1996 | Yagishita et al. |
| 5,565,907 | A | 10/1996 | Wada et al. |
| 5,923,828 | A | 7/1999 | Yagishita |
| 6,480,623 | B1 | 11/2002 | Yagishita et al. |
| 6,507,674 | B1 | 1/2003 | Yagishita et al. |
| 6,512,507 | B1 * | 1/2003 | Furihata et al. ............... 345/157 |
| 6,519,052 | B1 | 2/2003 | Oneda et al. |
| 6,556,707 | B1 | 4/2003 | Yagishita et al. |
| 6,704,455 | B1 | 3/2004 | Yamazaki et al. |
| 6,788,811 | B1 | 9/2004 | Matsuura et al. |
| 6,829,394 | B2 * | 12/2004 | Hiramatsu ................... 382/291 |
| 7,046,387 | B1 | 5/2006 | Yagishita et al. |

(Continued)

FOREIGN PATENT DOCUMENTS

| CN | 1641471 A | 7/2005 |
| CN | 1666222 A | 9/2005 |

(Continued)

OTHER PUBLICATIONS

Combined Office Action and Search Report issued on Oct. 10, 2015 in Chinese Patent Application No. 201310176335.4 with English translation.

*Primary Examiner* — Liliana Cerullo
(74) *Attorney, Agent, or Firm* — Oblon, McClelland, Maier & Neustadt, L.L.P

(57) ABSTRACT

In the present invention, an image is projected so as to form an acute angle between an axis of projection from a projection device and a screen; the projected image and an image of a perimeter thereof are captured; and a process corresponding to an operation about to be performed by a user is executed based on a shadow area of a finger of the user included in the captured image.

11 Claims, 15 Drawing Sheets

(56) References Cited

U.S. PATENT DOCUMENTS

| | | |
|---|---|---|
| 7,502,488 B2 | 3/2009 | Abe et al. |
| 2001/0022861 A1* | 9/2001 | Hiramatsu .................... 382/291 |
| 2001/0028341 A1* | 10/2001 | Kitazawa ...................... 345/156 |
| 2001/0043752 A1 | 11/2001 | Matsuura et al. |
| 2002/0031276 A1 | 3/2002 | Yagishita et al. |
| 2002/0191224 A1 | 12/2002 | Yagishita et al. |
| 2002/0191855 A1 | 12/2002 | Matsuura et al. |
| 2003/0012445 A1 | 1/2003 | Matsuura et al. |
| 2003/0039390 A1 | 2/2003 | Yagishita et al. |
| 2003/0048923 A1 | 3/2003 | Yagishita et al. |
| 2003/0128881 A1 | 7/2003 | Yagishita et al. |
| 2003/0137494 A1* | 7/2003 | Tulbert ......................... 345/173 |
| 2003/0198397 A1 | 10/2003 | Matsuura et al. |
| 2004/0071364 A1 | 4/2004 | Yamazaki et al. |
| 2004/0114819 A1 | 6/2004 | Matsuura et al. |
| 2004/0130738 A1 | 7/2004 | Yagishita et al. |
| 2004/0131265 A1 | 7/2004 | Yagishita et al. |
| 2004/0170329 A1 | 9/2004 | Yagishita et al. |
| 2004/0179239 A1 | 9/2004 | Yamazaki et al. |
| 2007/0071283 A1 | 3/2007 | Yagishita |
| 2009/0021794 A1 | 1/2009 | Hara et al. |
| 2010/0046044 A1 | 2/2010 | Ishizu et al. |
| 2010/0188428 A1* | 7/2010 | Shin et al. .................... 345/661 |
| 2010/0302207 A1* | 12/2010 | Dung ............................ 345/175 |
| 2011/0051173 A1 | 3/2011 | Yagishita |
| 2011/0302535 A1* | 12/2011 | Clerc ...................... G06F 3/017 715/848 |
| 2012/0098754 A1* | 4/2012 | Kim .............................. 345/173 |
| 2012/0098865 A1* | 4/2012 | Takano et al. ................ 345/660 |
| 2012/0139827 A1* | 6/2012 | Li et al. ........................ 345/156 |
| 2012/0204133 A1* | 8/2012 | Guendelman ........... G06F 3/017 715/863 |
| 2012/0236344 A1 | 9/2012 | Nagase et al. |
| 2013/0328770 A1* | 12/2013 | Parham ........................ 345/157 |
| 2014/0232695 A1* | 8/2014 | McGaughan et al. ........ 345/175 |
| 2014/0240293 A1* | 8/2014 | McCaughan et al. ......... 345/175 |

FOREIGN PATENT DOCUMENTS

| | | |
|---|---|---|
| CN | 101694694 A | 4/2010 |
| CN | 102447865 A | 5/2012 |
| CN | 102457730 A | 5/2012 |
| JP | H07-129322 | 5/1995 |
| JP | 8-195846 A | 7/1996 |
| JP | 3729533 | 10/2005 |
| JP | 2009-070245 | 4/2009 |
| JP | 2009-295031 | 12/2009 |
| JP | 2011-250046 | 12/2011 |

* cited by examiner

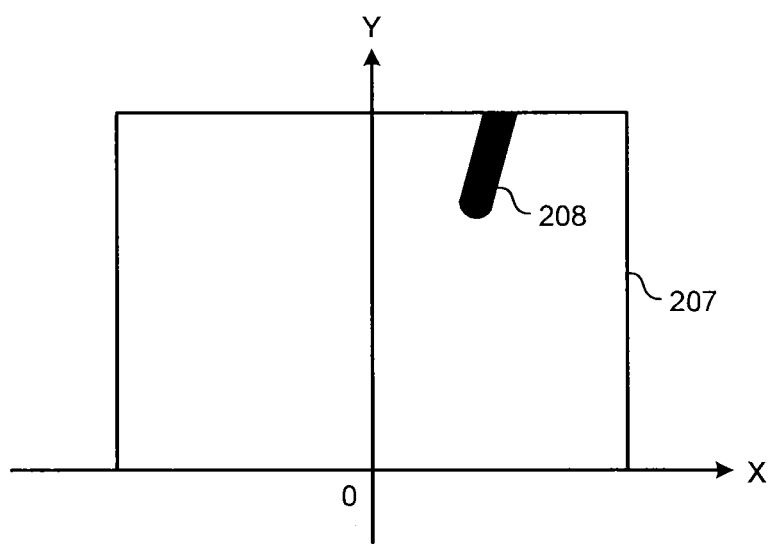
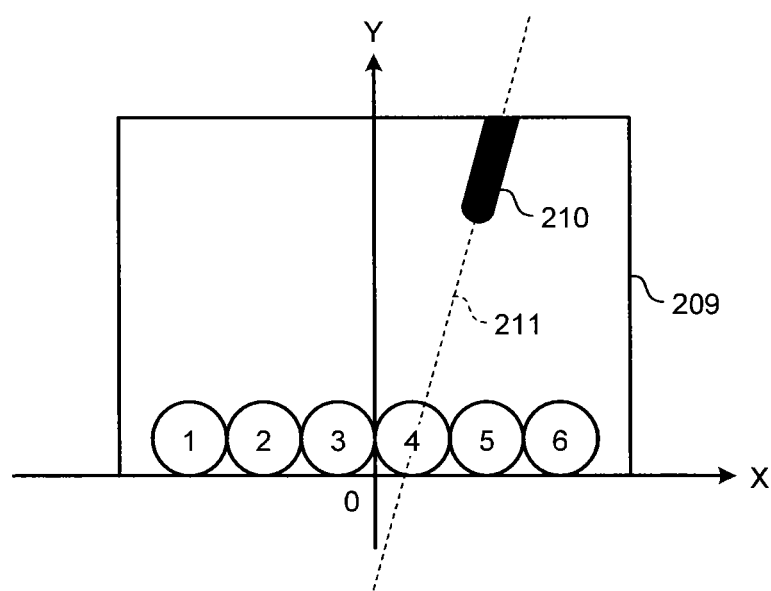

FIG.20
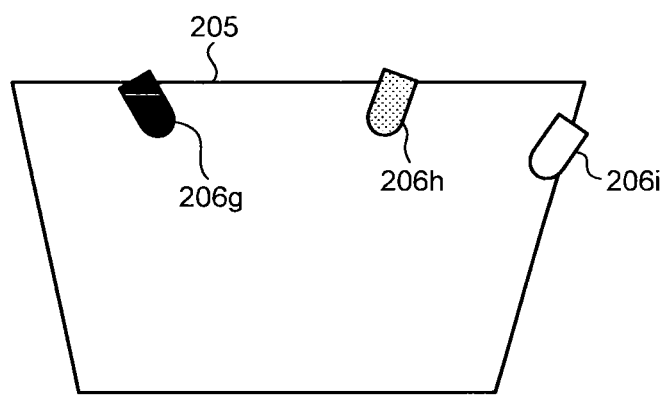
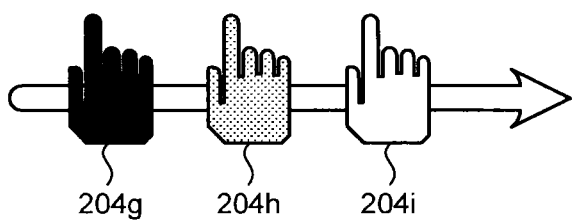

IMAGE PROCESSING APPARATUS, COMPUTER-READABLE RECORDING MEDIUM, AND IMAGE PROCESSING METHOD

CROSS-REFERENCE TO RELATED APPLICATIONS

The present application claims priority to and incorporates by reference the entire contents of Japanese Patent Application No. 2012-114843 filed in Japan on May 18, 2012 and Japanese Patent Application No. 2013-069791 filed in Japan on Mar. 28, 2013.

BACKGROUND OF THE INVENTION

1. Field of the Invention

The present invention relates to an image processing apparatus, a computer-readable recording medium including an image processing program, and an image processing method, and particularly relates to an image projection display method in an image projection display device.

2. Description of the Related Art

In order to display information for a plurality of people, for example, in meetings, lectures, or presentations, it is conventionally common to use a projection device such as a projector to enlarge and project an image or a moving image showing necessary information onto a wall or a screen, and to give an explanation. In such situations in which the projection device is used, there are cases in which a speaker or a listener wants to write additional information to the above-mentioned image, or wants to designate or point a particular part of the projected image. There have already been contrived and known methods that allow the speaker or the listener to conduct the above-described action in the above-described cases by using a pointing stick or a speaker's or listener's own finger.

As one of such methods, there is known, as described in Japanese Patent No. 3729533, a pointing system that displays a trajectory traced by a user using a pointing stick on a screen with a projected image, as an image superimposed on the screen. As another method, there is known, as described in Japanese Patent Application Laid-open No. H7-129322, a computer display system that determines a button is pressed when a shadow of a pointing stick is placed at a position corresponding to an object image representing the button that is projected on a screen.

With the method described in Japanese Patent No. 3729533, the image can be drawn on the screen by the user who simply traces the screen with the pointing stick. However, the tip of the pointing stick needs to be in contact with the screen; therefore, the user needs to prepare a long pointing stick so as to prevent the user from entering a projection optical path. Therefore, the method described in Japanese Patent No. 3729533 has a problem that the pointing system functions merely as an ordinary projection device and cannot add or draw an image on the screen unless such a long pointing stick can be prepared.

With the method described in Japanese Patent Application Laid-open No. H7-129322, the above-described problem in Japanese Patent No. 3729533 does not occur because the user can achieve the same effect as the pressing of the button or can perform an operation by simply placing the shadow of the pointing stick or a finger at the image projected on the screen. However, with the method described in Japanese Patent Application Laid-open No. H7-129322, it is necessary to place, instead of the pointing stick or the finger itself, the shadow of the pointing stick or the finger at a designated position of the projected image while comprehensively taking into consideration a projection angle and a projection range of the image projected from the projection device, a standing position of the user, and the like. Therefore, there is a problem that the user cannot perform intuitive operations and needs skills and expertise to make full use of the system.

Hence, as described in Japanese Patent Application Laid-open No. 2009-070245, an image projection display device is known that projects an image from the rear side of a screen to allow a user to perform an operation by tracing the front surface of the screen while watching transmitted light of the projected image. Unlike the methods described in Japanese Patent No. 3729533 and Japanese Patent Application Laid-open No. H7-129322, because of being a rear-projection device, the image projection display device described in Japanese Patent Application Laid-open No. 2009-070245 prevents the user from intercepting the projection optical path, and enables the user to perform intuitive operations by directly touching the screen with a finger. Thus, with the image projection display device described in Japanese Patent Application Laid-open No. 2009-070245, there is no occurrence of the above-described problems occurring in Japanese Patent No. 3729533 and Japanese Patent Application Laid-open No. H7-129322. However, the image projection display device described in Japanese Patent Application Laid-open No. 2009-070245 has a problem of requiring an expensive screen that differs from ordinary screens and that is dedicated to the device.

The present invention has been made in order to solve such problems, and it is an aim of the present invention to allow a user to perform intuitive operations when the user performs the operations on an image projected on a screen with a low-cost and simple configuration.

SUMMARY OF THE INVENTION

It is an object of the present invention to at least partially solve the problems in the conventional technology.

According to the present invention, there is provided: an image processing apparatus comprising: an image acquisition unit configured to acquire a captured image obtained by imaging at least one of a projection surface onto which an image is projected so that the optical axis of projected light projected from a projection device and the projection surface form an acute angle and a perimeter of the projection surface; a shadow detection unit configured to detect, based on the captured image, a shadow produced by an object entering the optical path of the projected light on at least one of the projection surface and the perimeter of the projection surface; a pointed position determination unit configured to determine, based on the detected shadow, a position that differs from the position of the shadow on the projection surface and that has a predetermined relation with the position of the shadow to be a pointed position pointed by a user; and a pointing information output unit configured to output information corresponding to the determined pointed position.

The invention also provides a non-transitory computer-readable recording medium that contains an image processing program that comprises instructions for executing: a step of acquiring a captured image obtained by imaging at least one of a projection surface onto which an image is projected so that the optical axis of projected light projected from a projection device and the projection surface form an acute angle and a perimeter of the projection surface; a step of detecting, based on the captured image, a shadow produced by an object entering the optical path of the projected light on at least one of the projection surface and the perimeter of the projection surface; a step of determining, based on the detected shadow, a position that differs from the position of the shadow on the projection surface and that has a predetermined relation with the position of the shadow to be a pointed position pointed by a user; and a step of outputting information corresponding to the determined pointed position.

The invention also provides an image processing method comprising: acquiring a captured image obtained by imaging at least one of a projection surface onto which an image is projected so that the optical axis of projected light projected from a projection device and the projection surface form an acute angle and a perimeter of the projection surface; detecting, based on the captured image, a shadow produced by an object entering the optical path of the projected light on at least one of the projection surface and the perimeter of the projection surface; determining, based on the detected shadow, a position that differs from the position of the shadow on the projection surface and that has a predetermined relation with the position of the shadow to be a pointed position pointed by a user; and outputting information corresponding to the determined pointed position.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a diagram illustrating a difference image generated by an image processing unit according to the embodiment of the present invention;

FIG. 10 is a diagram illustrating a composite image generated by the image processing unit according to the embodiment of the present invention and a linear regression line;

FIG. 20 is a diagram illustrating a state in which the user performs an action of lightly sweeping a finger from left to right relative to a projection area.

DETAILED DESCRIPTION OF THE PREFERRED EMBODIMENTS

Embodiments of the present invention will be described below in detail with reference to accompanying drawings. In the embodiments, description will be made of, as an example, an image projection display device that performs processing in accordance with an action of a user who performs the action using a finger so as to perform an operation on an image projected on a screen.

First Embodiment

When the user performs the action using the finger so as to perform an operation on the image projected on the screen, the image projection display device according to a first embodiment can quickly and surely perform processing desired by the user based on the action. Therefore, with the image projection display device according to the present embodiment, the user can perform intuitive operations based on the image projected on the screen. A description will be made below in detail.

Figure 1:
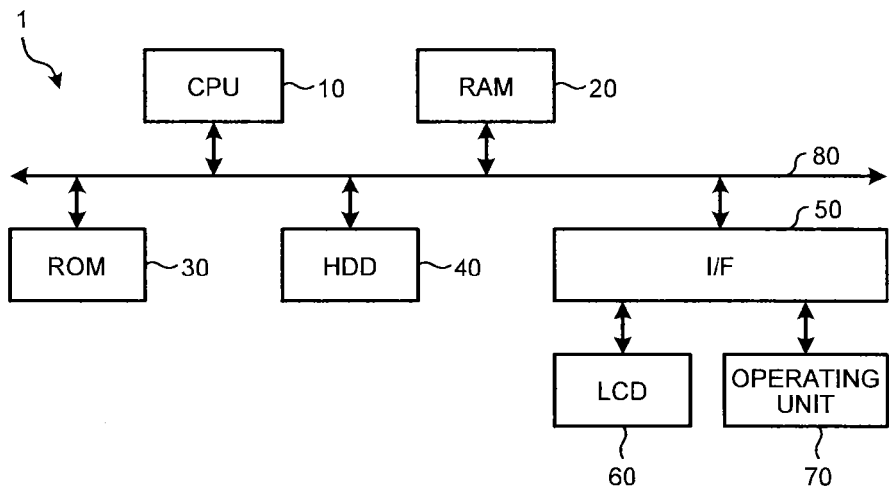
FIG. 1 is a block diagram schematically illustrating a hardware configuration of an image projection display device according to an embodiment of the present invention.

First, a hardware configuration of an image projection display device 1 according to the present embodiment will be described with reference to FIG. 1. FIG. 1 is a block diagram schematically illustrating the hardware configuration of the image projection display device 1 according to the present embodiment. Note that the image projection display device 1 is provided with, in addition to the hardware configuration illustrated in FIG. 1, optical mechanisms for projecting the image onto the screen and for capturing the screen with the image projected thereon and a perimeter thereof.

As illustrated in FIG. 1, the image projection display device 1 according to the present embodiment includes a similar configuration to that of general servers, personal computers (PCs), and the like. Specifically, in the image projection display device 1 according to the present embodiment, a central processing unit (CPU) 10, a random access memory (RAM) 20, a read-only memory (ROM) 30, a hard disk drive (HDD) 40, and an interface (I/F) 50 are connected to each other via a bus 80. In addition, a liquid crystal display (LCD) 60 and an operating unit 70 are connected to the I/F 50.

The CPU 10 is an arithmetic unit, and controls operation of the whole of the image projection display device 1. The RAM 20 is a volatile storage medium capable of high-speed reading and writing of information, and is used as a work area when the CPU 10 processes information. The ROM 30 is a read-only nonvolatile storage medium, and stores therein programs such as firmware. The HDD 40 is a nonvolatile storage medium capable of reading and writing of information, and stores therein an operating system (OS), various control programs, application programs, and the like.

The I/F 50 connects and controls the bus 80, various types of hardware and networks, and the like. The LCD 60 is a visual user interface for the user to check a status of the image projection display device 1. The operating unit 70 is an interface, including a keyboard and a mouse, for the user to enter information into the image projection display device 1.

In the hardware configuration described above, programs stored in a storage medium or media such as the ROM 30, the HDD 40, and/or an optical disc (not illustrated) are read into the RAM 20, and the CPU 10 carries out arithmetic operations according to the programs loaded in the RAM 20. Thus, a software control unit is constituted. The software control unit thus constituted is combined with the hardware to constitute functional blocks that implement functions of the image projection display device 1 according to the present embodiment.

Figure 2:
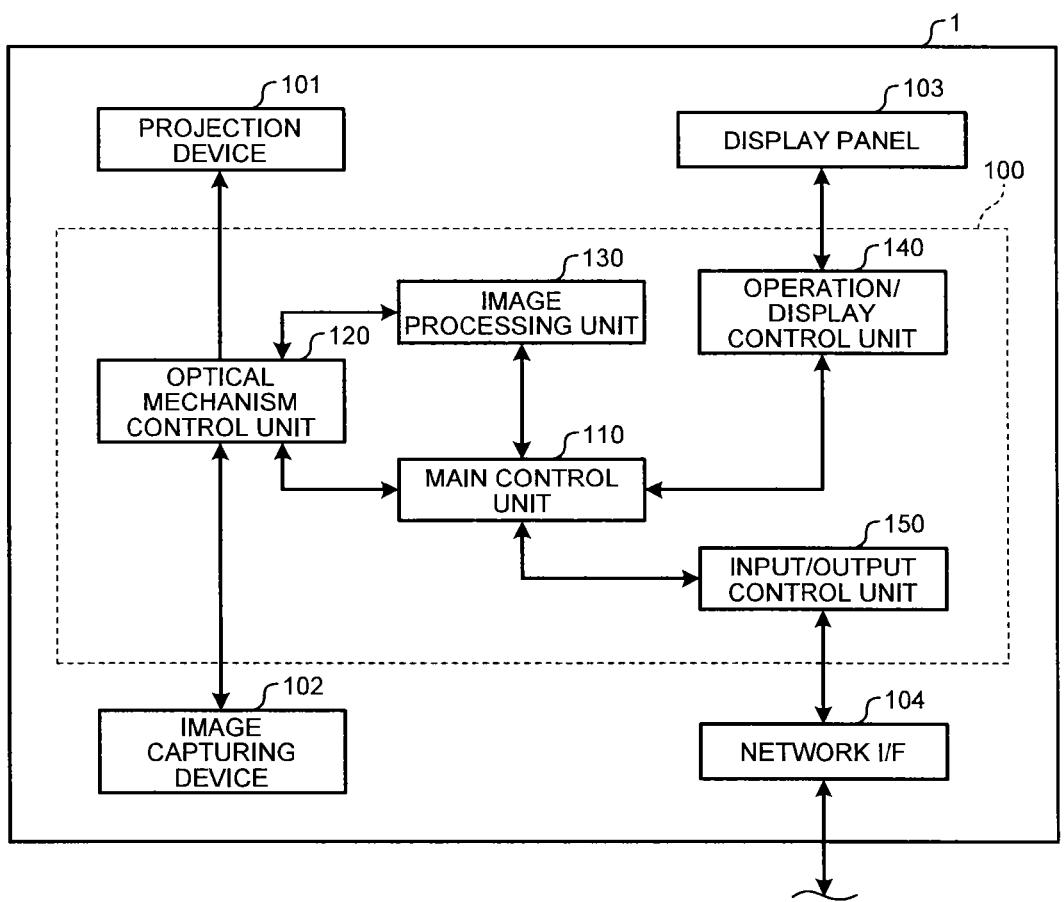
FIG. 2 is a block diagram schematically illustrating a functional configuration of the image projection display device according to the embodiment of the present invention.

Next, a functional configuration of the image projection display device 1 according to the present embodiment will be described with reference to FIG. 2. FIG. 2 is a block diagram schematically illustrating the functional configuration of the image projection display device 1 according to the present embodiment. As illustrated in FIG. 2, the image projection display device 1 includes a controller 100, a projection device 101, an image capturing device 102, a display panel 103, and a network I/F 104.

The controller 100 includes a main control unit 110, an optical mechanism control unit 120, an image processing unit 130, an operation/display control unit 140, and an input/output control unit 150. Note that electrical connections are indicated by solid-line arrows in FIG. 2.

According to control of the optical mechanism control unit 120, the projection device 101 projects and displays an image based on image data on the screen. Under the control of the optical mechanism control unit 120, the image capturing device 102 captures the screen with the image projected thereon and the perimeter thereof, and supplies the captured data to the controller 100.

The display panel 103 is an output interface that visually displays the status of the image projection display device 1, and in addition, is an input interface used as a touch panel when the user directly operates the image projection display device 1 or enters information into the image projection display device 1. In other words, the display panel 103 includes a function to display an image for receiving the operation by the user. The display panel 103 is implemented by the LCD 60 and the operating unit 70 illustrated in FIG. 1. Note that the image projection display device 1 according to the present embodiment may be provided with not only the display panel 103 but also a mechanical operating unit such as a hardware switch.

The network I/F 104 is an interface for the image projection display device 1 to communicate with client terminals such as PCs and other external devices via a network or the like, and uses an Ethernet (registered trademark) or a universal serial bus (USB) interface. The network I/F 104 is implemented by the I/F 50 illustrated in FIG. 1.

The controller 100 is constituted by a combination of software and hardware. Specifically, the programs stored in the nonvolatile storage medium or media such as the ROM 30, a nonvolatile memory, the HDD 40, and/or the optical disc are loaded into a volatile memory (hereinafter, a memory) such as the RAM 20, and the CPU 10 operates according to the programs to constitute the software control unit, which in turn constitutes the controller 100 in combination with the hardware such as an integrated circuit. The controller 100 serves as a control unit that controls the whole of the image projection display device 1.

The main control unit 110 plays the role of controlling the units included in the controller 100, and gives commands to the units of the controller 100. The optical mechanism control unit 120 plays a role as a driving unit that controls or drives the projection device 101, the image capturing device 102, and the like.

Under the control of the main control unit 110, the image processing unit 130 generates the image data to be projected from the projection device 101, and processes the captured image data captured and supplied by the image capturing device 102. The operation/display control unit 140 displays information on the display panel 103, and transmits the information entered via the display panel 103 to the main control unit 110. The input/output control unit 150 supplies information entered via the network I/F 104 to the main control unit 110. The main control unit 110 controls the input/output control unit 150 to access other devices such as the client terminals via the network I/F 104.

Figure 3:
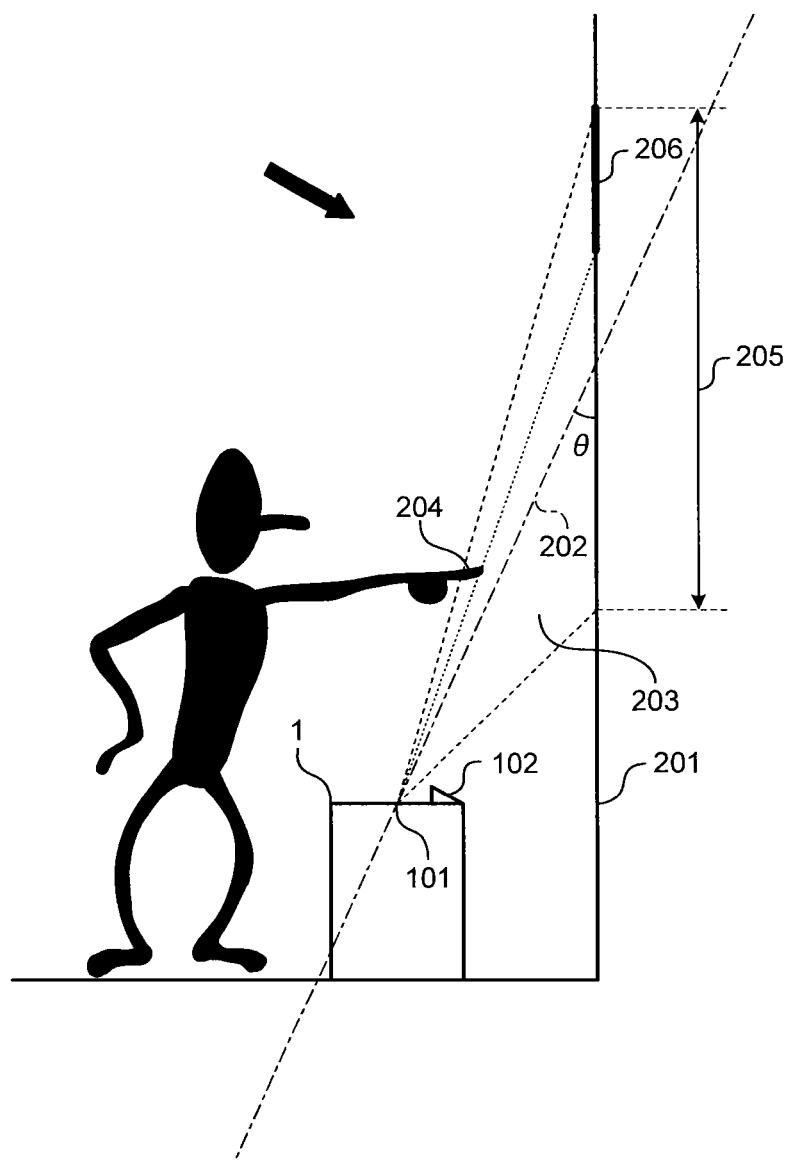
FIG. 3 is a diagram for explaining an operation mode of the image projection display device according to the embodiment of the present invention.

Next, an operation mode of the image projection display device 1 according to the present embodiment will be described with reference to FIG. 3. FIG. 3 is a diagram for explaining the operation mode of the image projection display device 1 according to the present embodiment. As illustrated in FIG. 3, the image projection display device 1 according to the present embodiment is placed between the user and a screen 201. As illustrated also in FIG. 3, the image projection display device 1 according to the present embodiment projects light thrown from the projection device 101 as an image projected and displayed on the screen 201.

At this time, as illustrated in FIG. 3, the projection device 101 projects the image so that an axis 202 of the projected light and the screen 201 form an acute angle "θ". When the user brings a finger 204 into a projection optical path 203, the projected light in that portion is blocked, so that a user's finger shadow 206 is produced in a projection area 205 on the screen 201. Furthermore, the image projection display device 1 according to the present embodiment uses the image capturing device 102 to capture the screen and the perimeter thereof including the user's finger shadow 206 produced in the projection area 205. Note that, as illustrated in FIG. 3, the image capturing device 102 is provided on the image projection display device 1 so as to be positioned between a projection port of the projection device 101 and the screen 201. Because of such a positional relation, it is possible to prevent a part of the body (such as a finger or an arm) of the user from appearing in the captured image captured by the image projection display device 1 using the image capturing device 102.

Although the description has been made of the example in FIG. 3 in which the image capturing device 102 is provided on the image projection display device 1, the image capturing device 102 need not be provided on the image projection display device 1, but may stand alone. In this case, the image capturing device 102 need not be positioned between the projection port of the projection device 101 and the screen 201, and the position of the image capturing device 102 is not limited as long as it is in a range in which a part of the body (such as a finger or an arm) of the user does not appear in the captured image. Although the description has been made of the example in FIG. 3 in which the projection device 101 is also provided on the image projection display device 1, the projection device 101 need not be provided on the image projection display device 1, but may exist stand-alone. In this case, the position of the projection device 101 is not limited as long as it is in a range of being capable of projecting an image so that the axis 202 of the projected light therefrom and the screen 201 form an acute angle.

One of the main features of the image projection display device 1 configured as mentioned above lies in that, when the user performs an action using a finger so as to perform an operation on the image projected on the screen 201, a process is performed based on the shadow produced on the screen 201 by the action. This enables the user, with the image projection display device 1 according to the present embodiment, to perform intuitive operations based on the image projected on the screen 201. Thus, anybody can easily perform operations on the image projection display device 1 via the image projected and displayed on the screen 201 without the need for skills or expertise.

Figure 4:
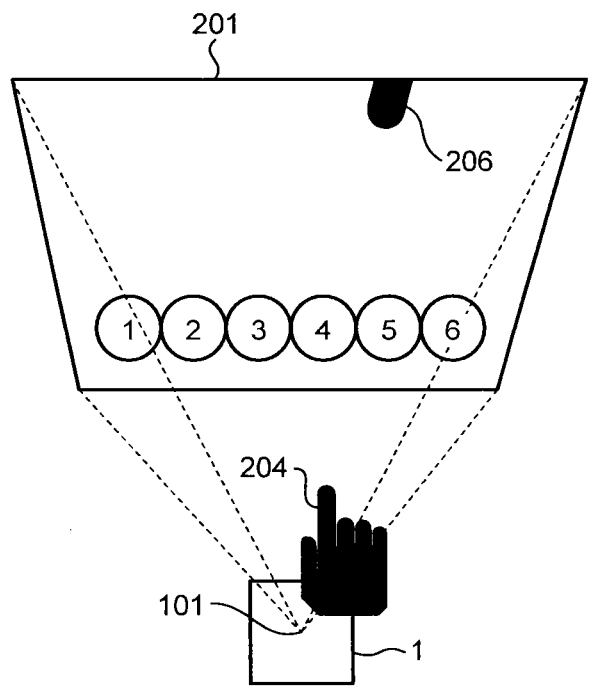
FIG. 4 is a diagram for explaining an example image projected from the image projection display device according to the embodiment of the present invention onto a screen and a shadow of a finger of a user.

Next, with reference to FIG. 4, a description will be made of an example image projected from the image projection display device 1 according to the present embodiment onto the screen 201 and of the shadow of the finger of the user. FIG. 4 is a diagram for explaining the example image projected from the image projection display device 1 according to the present embodiment onto the screen 201 and the shadow of the finger of the user. Note that FIG. 4 illustrates the screen 201 viewed from the direction of the arrow illustrated in FIG. 3.

As illustrated in FIG. 4, six button icons numbered from 1 to 6 are displayed so as to be arranged in a line in the horizontal direction in the image projected from the image projection display device 1 according to the present embodiment onto the screen 201. In addition, as a result of user's bringing of the finger 204 into the projection optical path 203 illustrated in FIG. 3, the user's finger shadow 206 is produced on the screen 201 as illustrated in FIG. 4.

Note that the six button icons illustrated in FIG. 4 are projected images, and therefore, the user cannot directly press the buttons in a physical manner. However, when the user performs an action of pressing the projected image, the image projection display device 1 performs, in accordance with the action, the same processing as that activated by pressing the button. In this manner, when the user wants to perform any operation on the image projected on the screen 201, the user needs to perform the action of bringing the finger into the projection optical path 203 so as to perform the operation. Exemplifying the case in which the six button icons are projected on the screen 201 illustrated in FIG. 4, a description will be made, with reference to FIG. 5, of an action of the user and a shape change of the user's finger shadow 206 when any of the button icons is pressed.

Figure 5:
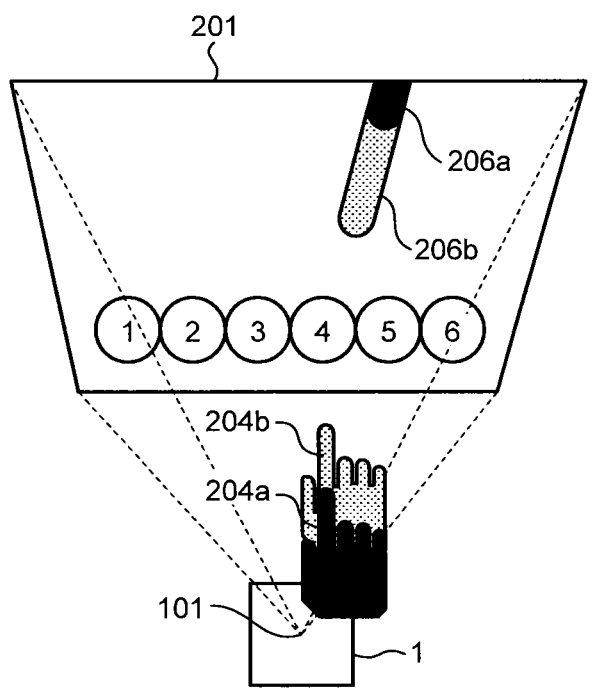
FIG. 5 is a diagram for explaining an action of the user and a shape change of the shadow of the finger of the user when any button is pressed in an example case in which the image illustrated in FIG. 4 is projected.

As illustrated in FIG. 5, in order to perform the action of pressing any of the six button icons illustrated in FIG. 4, the user needs to perform the action of bringing the finger 204 into the projection optical path 203 so that the finger comes close to the button icon. Note that FIG. 5 illustrates an example in which the finger 204 comes close to the button icon numbered "4".

As illustrated in FIG. 5, the finger 204 of the user moves from a position indicated by 204a to a position indicated by 204b, whereby the shadow 206 produced by the finger of the user changes its shape from a shape indicated by 206a to a shape indicated by 206b so as to move from an upper part toward a lower part of the screen 201. This is because, as described above with reference to FIG. 3, the projection device 101 on the image projection display device 1 according to the present embodiment projects and displays the image so that the axis 202 of the projected light therefrom and the screen 201 form an acute angle. One of the main features of the image projection display device 1 according to the present embodiment is to determine which of the buttons is about to be pressed based on the user's finger shadow 206 that has changed its shape as described above. In this manner, when the button icons lie in positions different from that of the user's finger shadow 206 produced on the screen 201, the image projection display device 1 according to the present embodiment can precisely and quickly determine which of the buttons is about to be pressed.

Note that, when the axis 202 of the projected light and the screen 201 form an acute angle as described in FIG. 3, the image projected and displayed on the screen 201 is essentially distorted in a trapezoidal manner so as to be reduced in width toward the top of the screen 201, compared with a source image to be projected (hereinafter called an "original image"). The image projection display device 1 according to the present embodiment prevents such a problem from occurring by applying keystone correction for electronically canceling the trapezoidal distortion. Consequently, the image projection display device 1 according to the present embodiment can make the coordinate system of the original image (hereinafter called an "original image coordinate system") coincide with the coordinate system of the image actually projected and displayed on the screen 201 (hereinafter called a "projected image coordinate system").

Figure 6:
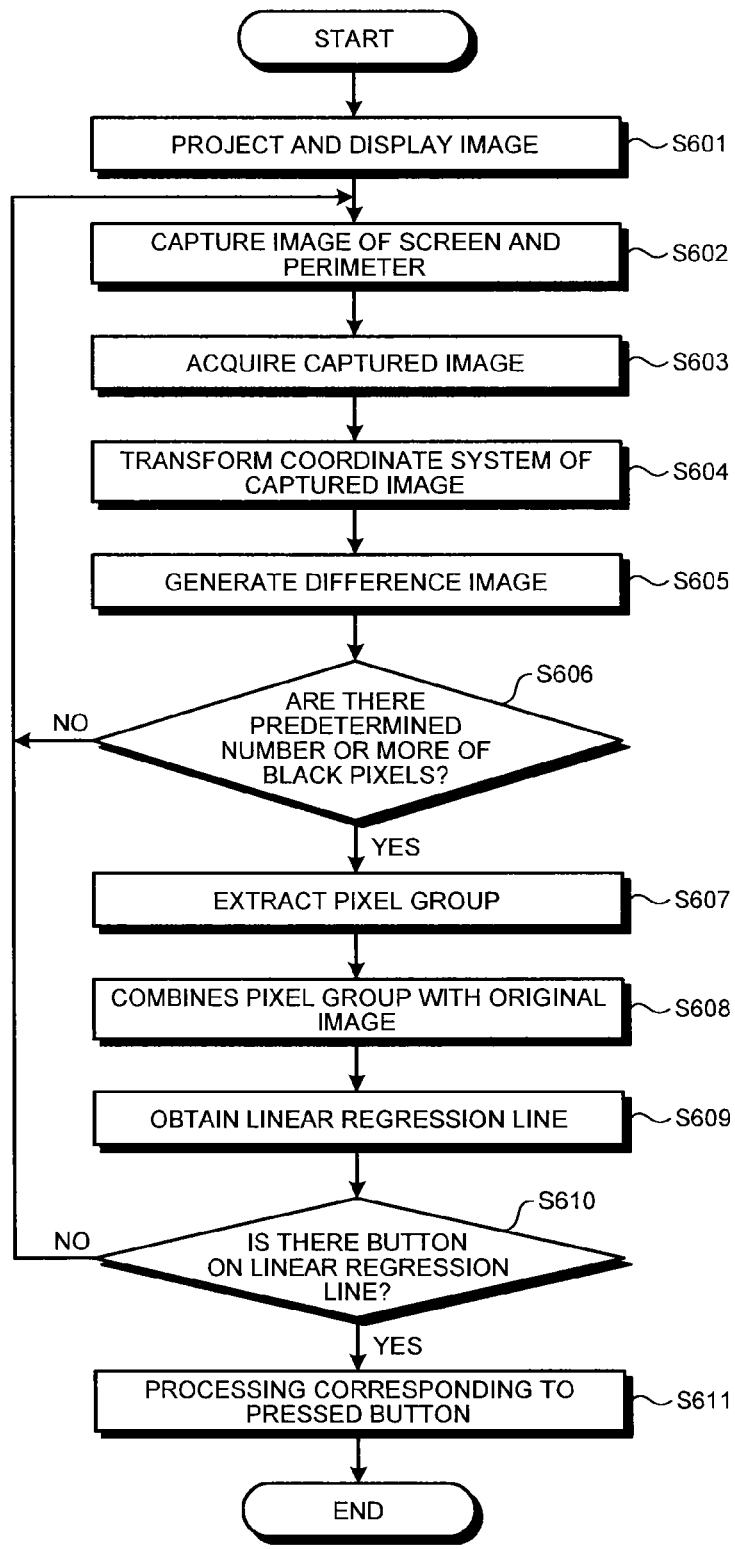
FIG. 6 is a flowchart for explaining a process in which the image projection display device according to the embodiment of the present invention determines a button that is about to be pressed by the user, and a process performed after the button is determined to have been pressed.

Next, with reference to FIG. 6, a description will be made of a process in which the image projection display device 1 according to the present embodiment determines the button that is about to be pressed by the user when the user performs the action described in FIG. 5, and of a process performed after the button is determined to have been pressed. FIG. 6 is a flowchart for explaining the process in which the image projection display device 1 according to the present embodiment determines the button about to be pressed by the user, and the process performed after the button is determined to have been pressed.

As illustrated in FIG. 6, when the image projection display device 1 according to the present embodiment determines a button about to be pressed by the user, the projection device 101 first projects and displays an image on the screen 201 under the control of the optical mechanism control unit 120 (S601). A description will be made below of, as an example, a case in which the image illustrated in FIG. 4 is projected and displayed on the screen 201. Then, after the image is projected from the projection device 101 and displayed on the screen 201, the image capturing device 102 captures the screen 201 and the perimeter thereof under the control of the optical mechanism control unit 120 (S602). After the image capturing device 102 captures the screen 201 and the perimeter thereof, the image processing unit 130 acquires the captured image (S603). After acquiring the captured image, the image processing unit 130 transforms the captured image into an image in the original image coordinate system (S604).

Figure 7:
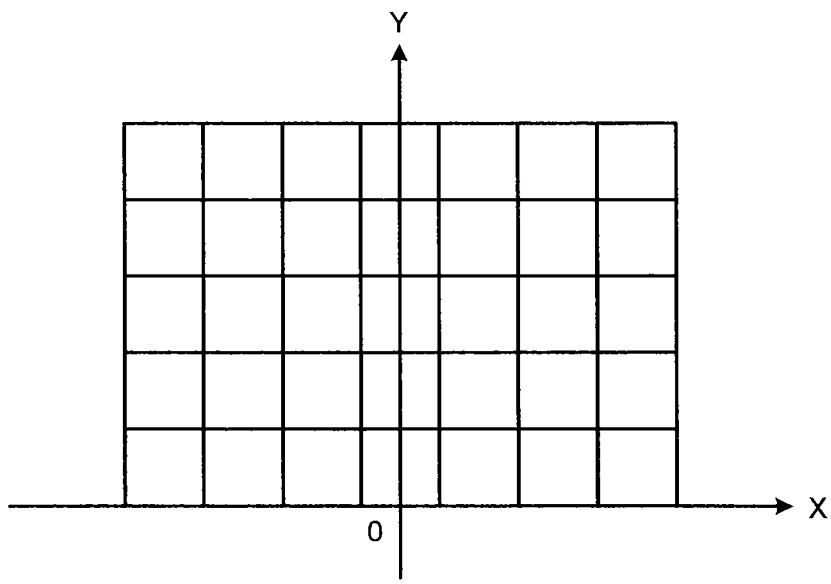
FIG. 7 is a diagram illustrating a horizontal/vertical line grid pattern image that is projected and displayed onto the screen from a projection device by the image projection display device according to the embodiment of the present invention.

Here, the process of S604, that is, the process of transforming the captured image into the image in the original image coordinate system will be described with reference to FIGS. 7 and 8. FIG. 7 is a diagram illustrating a horizontal/vertical line grid pattern image that is projected and displayed on the screen 201 from the projection device 101 by the image projection display device 1 according to the present embodiment. The term "horizontal/vertical line grid pattern image" refers to an image in which, in the projected image coordinate system on the screen 201, a plurality of line segments parallel to the axes of the coordinates are arranged at even intervals, as illustrated in FIG. 7. As described above, the image projection display device 1 according to the present embodiment can make the original image coordinate system coincide with the projected image coordinate system by applying the keystone correction. This makes the horizontal/vertical line grid pattern image that is projected and displayed on the screen 201 as illustrated in FIG. 7 coincide with the horizontal/vertical line grid pattern image of the original image.

Figure 8:
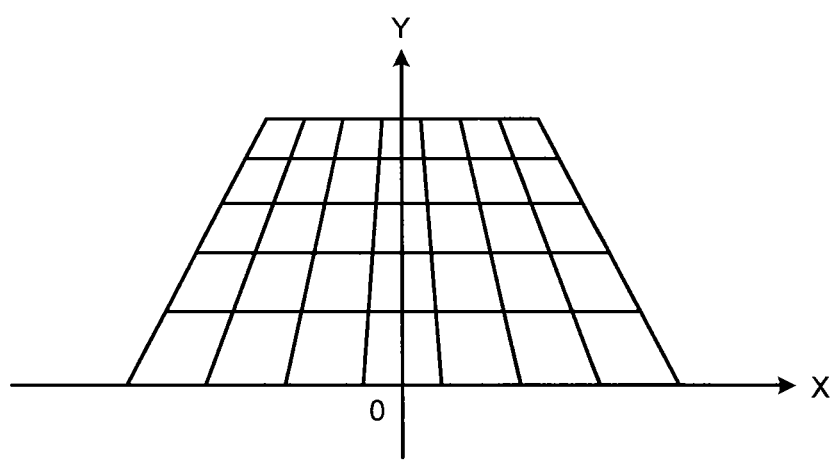
FIG. 8 illustrates a captured image obtained by capturing the horizontal/vertical line grid pattern image illustrated in FIG. 7 using an image capturing device.

FIG. 8 illustrates a captured image obtained by capturing the horizontal/vertical line grid pattern image illustrated in FIG. 7 using the image capturing device 102. As illustrated in FIG. 3, the image capturing device 102 according to the present embodiment is provided on the image projection display device 1 so as to be positioned between the projection port of the projection device 101 and the screen 201. Therefore, when the image capturing device 102 captures the horizontal/vertical line grid pattern image that is projected and displayed on the screen 201 as illustrated in FIG. 7, the horizontal/vertical line grid pattern image in the coordinate system of the captured image (hereinafter called a "captured image coordinate system") takes a shape distorted to be a trapezoid as illustrated in FIG. 8.

Accordingly, the transformation of the captured image into the image in the original image coordinate system (S604) is performed by obtaining, in advance, a transformation equation for making the coordinate system illustrated in FIG. 8 coincide with the coordinate system illustrated in FIG. 7, that is, for making the captured image coordinate system coincide with the original image coordinate system, and by applying the transformation equation to the captured image obtained at S603. By performing such a transformation, the image projection display device 1 according to the present embodiment can deal with, in the original image coordinate system, the captured image in the same manner as with the original image.

After transforming the captured image into the image in the original image coordinate system, the image processing unit 130 generates a difference image constituted by a difference between the transformed captured image (hereinafter called a "transformed image") and the original image (S605). Here, the difference image is generated, for example, by the following method: Both the transformed image and the original image are converted into grayscale images; differences of pixel values (such as 0 to 255) are obtained between mutually corresponding pixels of these images; a binary image is obtained in which pixels are set to black if absolute values of the differences are a predetermined value or more whereas the other pixels are set to white; and thus, the binary image serves as the difference image. Note that the method for generating the difference image is not limited to such a method, but may be another known method.

At this time, the pixels set to black can be pixels of a user's finger shadow produced on the screen 201. Hence, after generating the difference image, the image processing unit 130 determines whether the generated difference image contains a predetermined number or more of black pixels (S606). If the image processing unit 130 determines that the difference image contains the predetermined number or more of black pixels (Yes at S606), the group of the pixels is considered to be formed by a user's finger shadow produced on the screen 201. Therefore, in this case, subsequently to the process described above, the image projection display device 1 is to determine, based on the above-described pixel group in the difference image, which button is about to be pressed by the user (S607 to S611). FIG. 9 illustrates the difference image at this time. As illustrated in FIG. 9, in the difference image, a user's finger shadow region 208 is displayed in an original image region 207.

If the image processing unit 130 determines that the difference image does not contain the predetermined number or more of black pixels (No at S606), no shadow is considered to be produced on the screen 201. In this case, the image processing unit 130 repeats the process from S602 until the difference image contains the predetermined number or more of black pixels (Yes at S606), that is, until the user's finger shadow 206 is produced on the screen 201.

If the image processing unit 130 determines that the difference image contains the predetermined number or more of black pixels (Yes at S606), the image processing unit 130 extracts the black pixel group from the difference image (S607), and combines the extracted pixel group with the original image in the original image coordinate system (S608). Then, the image processing unit 130 uses the least-square method to obtain a linear regression line from the pixel group combined in the original image coordinate system (S609). The linear regression line obtained here is a straight line that is obtained by making a calculation so as to minimize the sum of squares of distances between the straight line and pixels contained in the combined pixel group. When a button exists on this straight line, the image projection display device 1 can determine that the user is about to press the button. FIG. 10 illustrates the composite image and the linear regression line at this time. FIG. 10 displays an original image region 209, a user's finger shadow region (that is, the pixel group combined in the process at S608) 210, and a linear regression line 211 in the original image coordinate system.

Next, the image processing unit 130 determines whether a button icon exists on the linear regression line 211 in the composite image in the original image coordinate system (S610). If the image processing unit 130 determines that a button icon exists on the linear regression line 211 (Yes at S610), it is considered that the user is about to press the button. Accordingly, the image projection display device 1 according to the present embodiment performs a predetermined process set in advance as a response to the pressing of the button (S611).

Here, the expression "predetermined process set in advance" refers to a process responding to an operation intended by the user, such as a process in which, under the control of the optical mechanism control unit 120, the projection device 101 shifts the display from a currently displayed image to another image, or displays a scroll screen of a currently displayed page. In other words, the optical mechanism control unit 120 serves here as a pointing information output unit. In the process from S603 to S610, the image processing unit 130 serves as an image acquisition unit, a shadow detection unit and a pointed position determination unit. In this manner, the image projection display device 1 according to the present embodiment can quickly and surely perform processing corresponding to an operation about to be performed by the user based on the user's finger shadow, and this is one of the main features of the image projection display device 1 according to the present embodiment.

Note that, if a plurality of button icons are displayed in the projected image, and more than one of the button icons exist on the linear regression line 211, it is difficult for the image projection display device 1 to determine which of the buttons is about to be pressed. Therefore, the button icons are preferably arranged in the projected image so that two or more of the button icons do not exist on the linear regression line 211. For example, with the configuration according to the present embodiment, the user's finger shadow 206 is produced so as to be directed substantially parallel to the axis 202 of the projected light on the screen 201; therefore, as illustrated in FIG. 10, the linear regression line 211 is also inclined to be parallel to the axis 202 of the projected light in the original image coordinate system. Therefore, when a plurality of button icons are displayed in the projected image, the problem described above can be avoided by arranging the button icons on a straight line in a direction substantially perpendicular to the axis 202 of the projected light.

While the button icons are not arranged on a straight line in the direction substantially perpendicular to the axis 202 of the projected light, if only they are arranged so as to be located in positions different from each other in the direction substantially perpendicular to the axis 202 of the projected light, the problem described above can be avoided regardless of positions in a direction substantially parallel to the axis 202 of the projected light. Note that, if a button icon is arranged near the right or left end of the projected image, there can be a case in which the linear regression line 211 based on the user's finger shadow 206 pointing the button icon is not substantially parallel to the axis 202 of the projected light. In that case, the fact that the button icons are arranged in the same position in the direction substantially perpendicular to the axis 202 of the projected light does not necessarily mean that the linear regression line 211 has more than one button icon existing thereon. Therefore, such an arrangement is allowable.

When the image processing unit 130 determines that a button icon exists on the linear regression line 211 (Yes at S610), the determination may be a result of an operation not intended by the user, such as a result of an action by mistake of the user or a result of generation of another unrelated shadow on the screen 201. In such a case, if the processing proceeds to a process (such as switching of images) initiated by pressing of a button immediately after the image processing unit 130 determines that a button icon exists on the linear regression line 211, the image projection display device 1 results in performing a process against the intention of the user. The image projection display device 1 according to the present embodiment can avoid the above-mentioned problem by not proceeding to a process initiated by pressing of a button immediately after the image processing unit 130 determines that a button icon exists on the linear regression line 211, but by using, for example, the following method.

Specifically, first, in the process of S610 for the first time, if determining that a button icon exists on the linear regression line 211, the image processing unit 130 performs only a process of increasing the lightness of the button icon. Then, the image processing unit 130 changes the value of the predetermined number of black pixels serving as a reference value used at the determination in the process of S606, and thereafter performs again the process from S602. The image projection display device 1 according to the present embodiment proceeds to a process initiated by pressing of a button only after the image processing unit 130 determines again that a button icon exists on the linear regression line 211 as a result of the above-described processing. By employing the configuration described above, the image projection display device 1 according to the present embodiment can avoid the problem of performing a process against the intention of the user.

The process from S602 to S610, that is, the process of capturing the image projected on the screen 201 and detecting the operation of the user, is repeatedly executed at a predetermined rate, such as at a rate of several times per second. Reliability of operation can be improved if pressing of a button icon is determined to be recognized after the same button icon is detected to be pressed a plurality of times in a row.

The image projection display device 1 according to the present embodiment may be configured to display a button icon in a depressed form immediately before proceeding to a process (such as switching of images) initiated when the button is pressed. By employing the configuration described above, the image projection display device 1 according to the present embodiment can clearly inform the user that the process initiated when the button is pressed is performed.

If the image processing unit 130 determines that no button icon exists on the linear regression line 211 (No at S610), it is considered that the user is not about to press any button. Accordingly, the image processing unit 130 repeats the process from S602 until a button icon exists on the linear regression line 211 (Yes at S610). Then, after terminating the projection of the image, the image projection display device 1 terminates the process performed when determining the button about to be pressed by the user and the process performed after the button is determined to be pressed.

In the above-described process of S606, the description has been made in which the image processing unit 130 can determine that a shadow is produced on the screen 201 if a predetermined number or more of black pixels exist. The image processing unit 130 may otherwise be configured to determine that a shadow is produced on the screen 201 if a predetermined number or more of black pixels exist in a certain region. Such a configuration prevents the image processing unit 130 from making an erroneous determination even when a predetermined number or more of black pixels exist in a dispersed manner due to noise or the like.

In the present embodiment, the description has been made of the example in which the control and the processing for the image display are performed by software processing in the image processing unit 130. Alternatively, the control and the processing may be performed by hardware processing in a dedicated circuit, such as an application specific integrated circuit (ASIC) or a digital signal processor (DSP), for performing image processing.

In the present embodiment, the description has been made of what kind of processing is performed by the image projection display device 1 based on the user's finger shadow. Alternatively, the processing may be performed based on a shadow of a pointing stick, another pointing device, or the like operated by the user.

Figure 11:
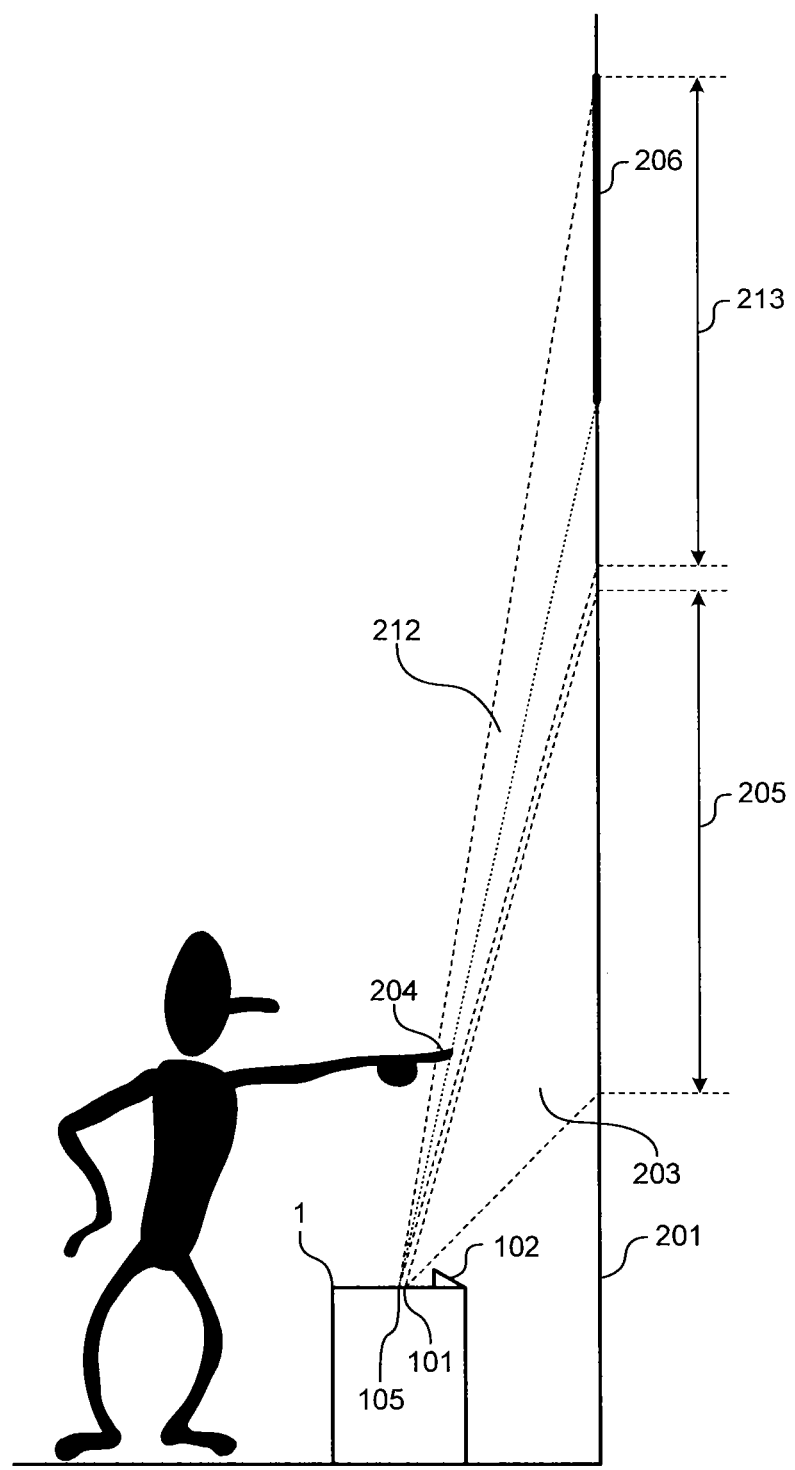
FIG. 11 is a diagram illustrating a configuration example of an image projection display device according to another embodiment of the present invention.

Furthermore, in the present embodiment, the description has been made of the example in which the image projection display device 1 is configured to detect the shadow produced in the image projected and displayed on the screen 201, but the image projection display device 1 may be configured, as illustrated in FIG. 11, to be provided with a light source 105 in a position nearer to the user than the projection device 101, to emit light from the light source 105 to an area outside the projection area on the screen 201, and to detect a shadow produced in the emitted light. In the case of such a configuration, as illustrated in FIG. 11, it is found that light 212 emitted from the light source 105 is projected as a light source area 213 onto a portion on the screen 201 above the projection area 205 of the image projected from the projection device 101. The user's finger shadow 206 is produced in the light source area 213.

By employing the configuration described above, the user's finger shadow 206 is produced outside of the projection area 205 of the image, and thus does not obstruct the projected image, so that visibility of the user can be improved. For the configuration described in the present embodiment in which the shadow is produced in the projection area 205, the color of the shadow produced on the screen 201 is light when the brightness of the projected image is low, whereby a problem occurs with the image processing unit 130 performing erroneous processing, for example. However, by employing the configuration described above, a shadow having a certain level or more of darkness can be produced on the screen 201 regardless of the brightness of the projected image.

Figure 12:
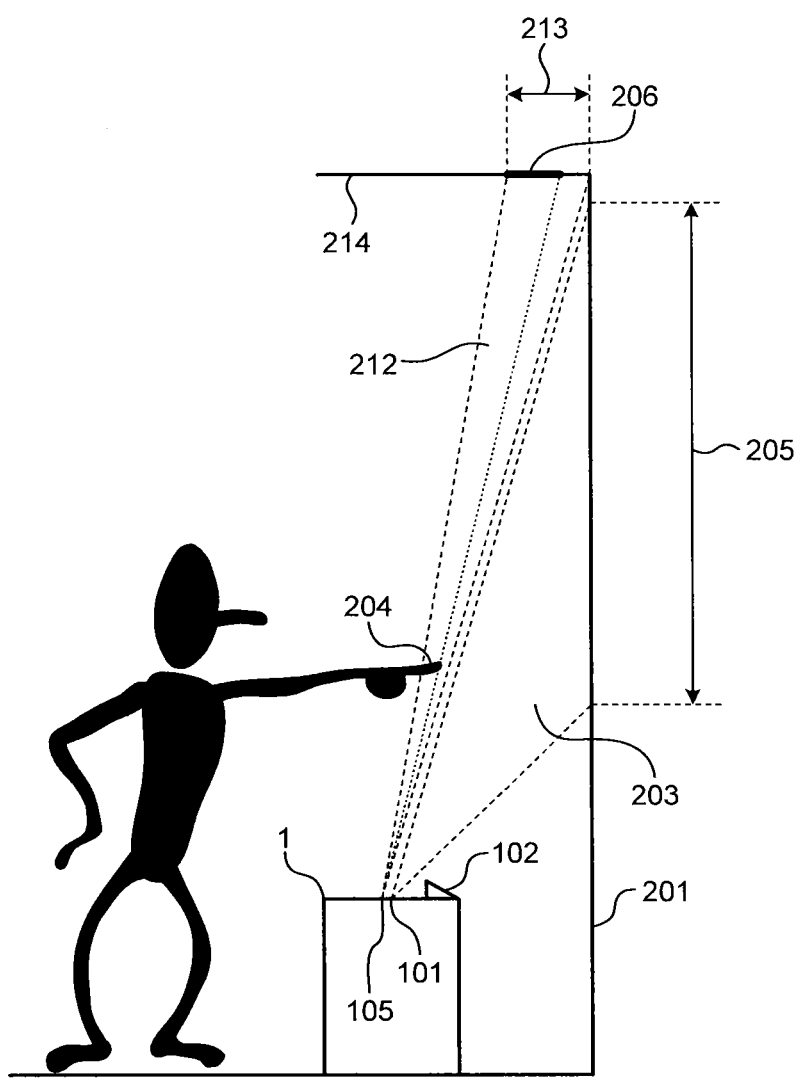
FIG. 12 is a diagram illustrating a configuration example of an image projection display device according to still another embodiment of the present invention.

The image projection display device 1 may have another configuration in which, as illustrated in FIG. 12, the light source 105 is provided in a position nearer to the user than the projection device 101 in the same manner as illustrated in FIG. 11, and emits light therefrom onto a bent portion 214 included in the screen 201, and a shadow produced in the emitted light is detected. In the case of such a configuration, as illustrated in FIG. 12, it is found that the light 212 emitted from the light source 105 is projected as the light source area 213 onto the bent portion 214. The user's finger shadow 206 is produced in the light source area 213.

By employing the configuration described above, the user's finger shadow 206 becomes less visible because it is produced outside the visual range. Thus, this effect, in addition to the effect obtained by the configuration described in FIG. 11, can further improve the visibility.

The light source 105 may exist stand-alone instead of being provided on the image projection display device 1. In such a case, the position of the light source 105 is not limited as long as it is in a range of producing the user's finger shadow 206 outside of the projection area 205 of the image or on the bent portion 214, as illustrated in FIG. 11 or 12, respectively.

Figure 13:
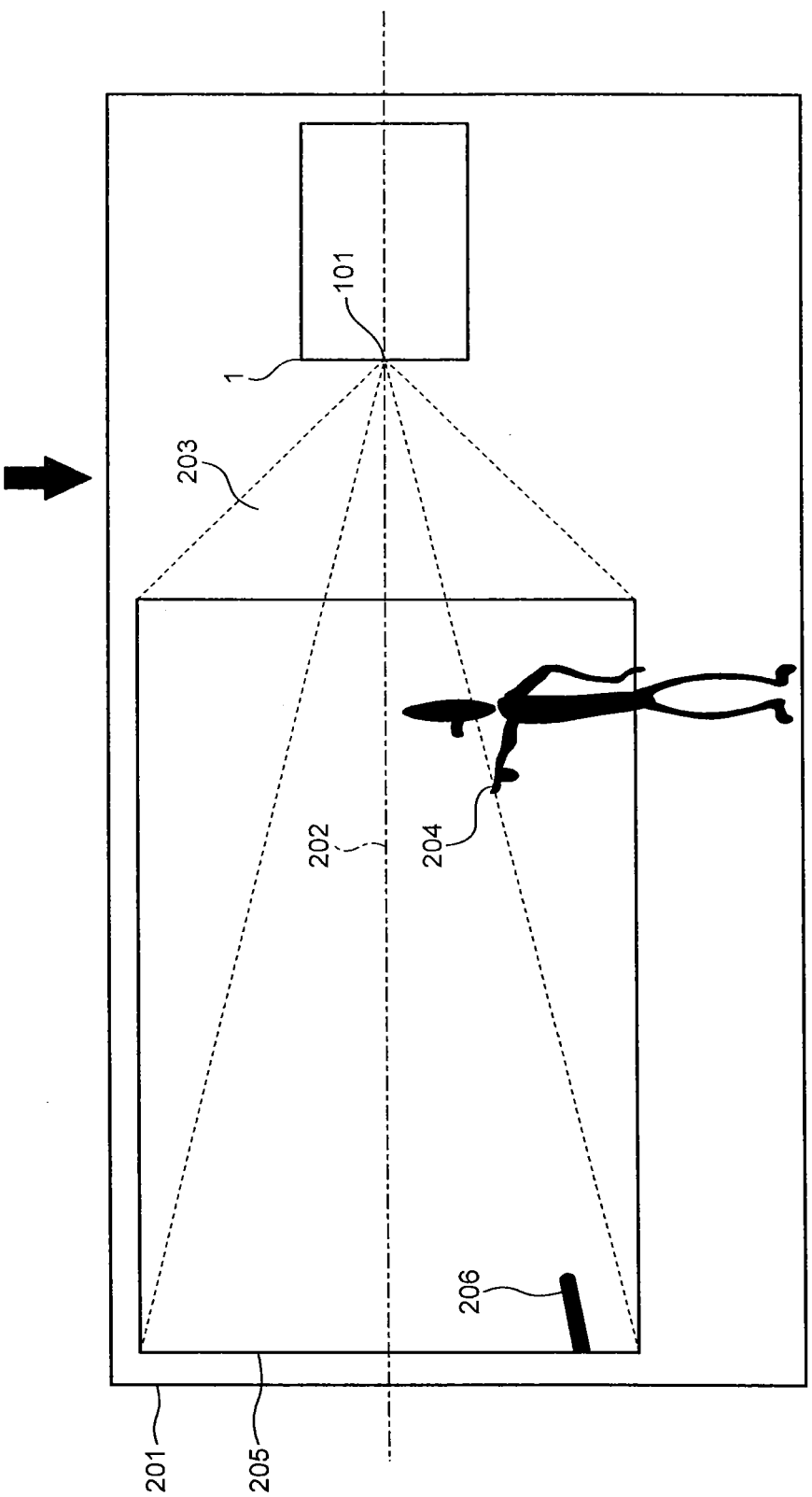
FIG. 13 is a diagram for explaining an operation mode of the image projection display device according to the other embodiment of the present invention.
Figure 14:
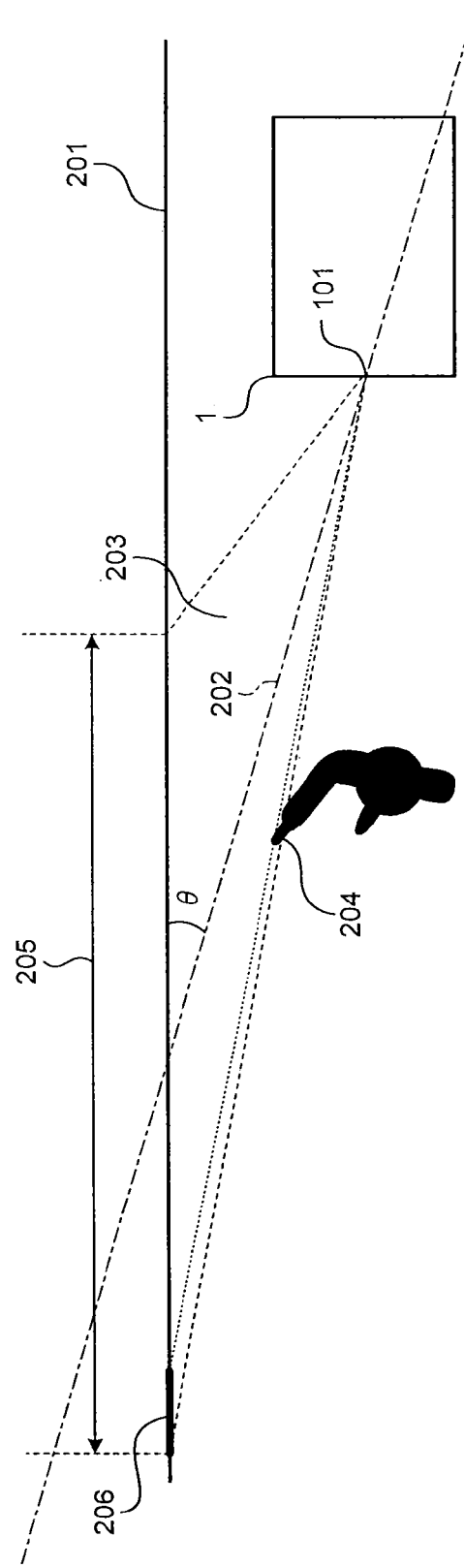
FIG. 14 is a diagram of the operation mode of the image projection display device illustrated in FIG. 13 when viewed from another angle.

The description has been made above of the example in which, as illustrated in FIG. 3, the screen 201 and the image projection display device 1 are arranged so as to project the image above the image projection display device 1. However, the same effect can be obtained by arranging the screen 201 and the image projection display device 1 so as to project the image onto the left side of the image projection display device 1, as illustrated in FIG. 13. Also in this case, as illustrated in FIG. 14, the angle "θ" formed between the axis 202 of the projected light and the screen 201 is an acute angle. Note that FIG. 14 illustrates a state viewed from the direction of the arrow illustrated in FIG. 13.

A similar effect can also be obtained by arranging the screen 201 and the image projection display device 1 inversely to the arrangement illustrated in FIG. 3 so as to project the image below the image projection display device 1, or by arranging the screen 201 and the image projection display device 1 inversely to the arrangement illustrated in FIG. 13 so as to project the image onto the right side of the image projection display device 1. Note that, also in these cases, the axis 202 of the projected light and the screen 201 form an acute angle.

Modification of First Embodiment

In the first embodiment describe above, the button icons are arranged on a straight line in the direction substantially perpendicular to the axis 202 of the projected light (also called the "X-axis direction" in the following description). However, not limited to this arrangement, the button icons may be arranged along the direction perpendicular to the X-axis direction (direction substantially parallel to the axis 202 of the projected light, which is also called the "Y-axis direction" in the following description). Here, the above described projection optical path 203 has a shape of a quadrangular pyramid. When the user moves the finger toward an area other than an area near the center of the projection area 205, the hand enters various areas and the above-described linear regression line 211 also inclines at various angles depending on the position in the height direction (position in the Y-axis direction) of the finger. In particular, in the right and left end portions of the projection area 205, the inclination of the linear regression line 211 significantly changes depending on the position in the height direction of the finger brought in. Therefore, even when the button icons are arranged along the Y-axis direction, it is possible to determine which button is about to be pressed by the user based on the above-described linear regression line 211. In other words, the button icons are arranged in any form and not limited to the form of arranging the button icons on a straight line in the direction substantially perpendicular to the axis 202 of the projected light.

Figure 15:
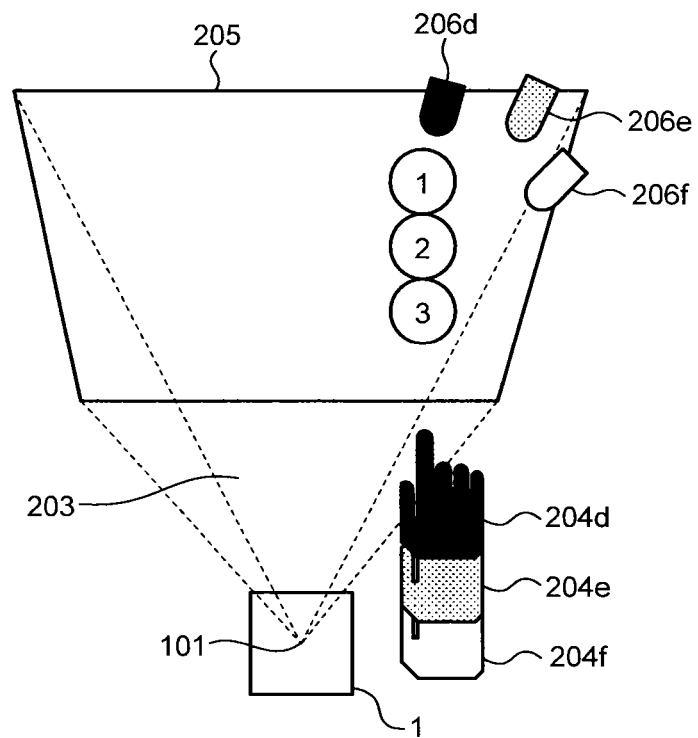
FIG. 15 is a diagram schematically illustrating a correspondence between a position of the finger of the user and the shadow of the finger produced on the screen.

In the example of FIG. 15, reference numeral "204d" represents a position of the finger when the user moves the finger toward the projection area 205 to press a button icon numbered "1", and reference numeral "206d" represents the shadow of the finger produced on the projection area 205 (screen 201). Reference numeral "204e" represents a position of the finger when the user moves the finger toward the projection area 205 to press a button icon numbered "2" arranged immediately below the button icon numbered "1", and reference numeral "206e" represents the shadow of the finger produced on the projection area 205 (screen 201). Reference numeral "204f" represents a position of the finger when the user moves the finger toward the projection area 205 to press a button icon numbered "3" arranged immediately below the button icon numbered "2", and reference numeral "206f" represents the shadow of the finger produced on the projection area 205 (screen 201).

Second Embodiment

Next, a second embodiment will be described. In the second embodiment, the button icons displayed in the image projected on the screen 201 only need to be arranged in positions different from each other, and need not be arranged on a straight line in the direction substantially perpendicular to the axis 202 of the projected light in the same manner as in the first embodiment.

The second embodiment also differs from the first embodiment in that the above-described image processing unit 130 has a function of, when having determined that two or more button icons can example of icons) exist on the linear regression line 211, determining the button icon about to be pressed by the user (determining the pointed position pointed by the user) based on the speed at which the shadow produced on the screen 201 stretches.

Figure 16:
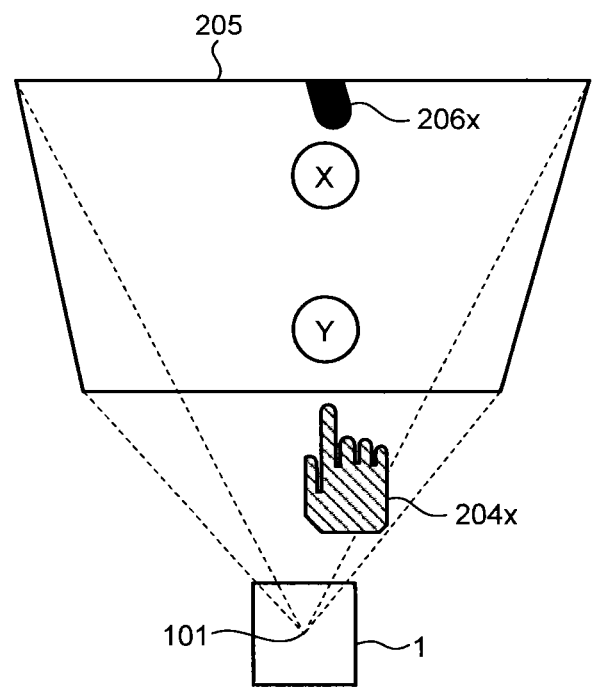
FIG. 16 is a diagram schematically illustrating a correspondence between a position of the finger of the user and the shadow of the finger produced on the screen.
Figure 17:
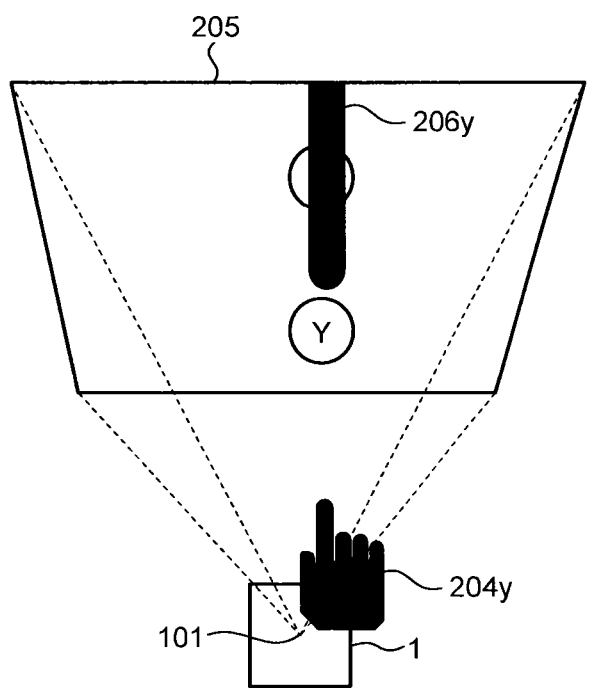
FIG. 17 is a diagram schematically illustrating a correspondence between a position of the finger of the user and the shadow of the finger produced on the screen.

Here, for example, as illustrated in FIGS. 16 and 17, a case is assumed in which two button icons displayed in the projection area 205 (on the screen 201) are arranged on a straight line along a direction substantially parallel to the axis 202 of the projected light (along the Y-axis direction). This example arranges a button icon numbered "Y" below a button icon numbered "X". FIG. 16 illustrates a state in which the user moves the finger toward the projection area 205 to press the button icon numbered "X", where the position of the finger of the user is represented by "204x" and the shadow produced on the projection area 205 (screen 201) is represented by "206x". FIG. 17 illustrates a state in which the user moves the finger toward the projection area 205 to press the button icon numbered "Y", where the position of the finger of the user is represented by "204y" and the shadow produced on the projection area 205 is represented by "206y".

Assume that the user moves forward the finger at a constant speed. As is understood from FIGS. 16 and 17, the shadow 206 produced in the projection area 205 stretches at a higher speed in the case in which the user moves forward the finger to press the button icon numbered "Y" than in the case in which the user moves forward the finger to press the button icon numbered "X". The present embodiment pays attention to the fact that the speed at which the shadow 206 stretches when the user moves forward the finger to press a button icon varies depending on the position in the Y-axis direction of the button icon. Thus, one of the features of the present embodiment is that, when it is determined that two or more button icons exist on the linear regression line 211, the button icon about to be pressed by the user is determined based on the stretching speed of the shadow 206. A specific configuration will be described below. Note that portions common to those of the first embodiment will be omitted from the description as appropriate.

Figure 18:
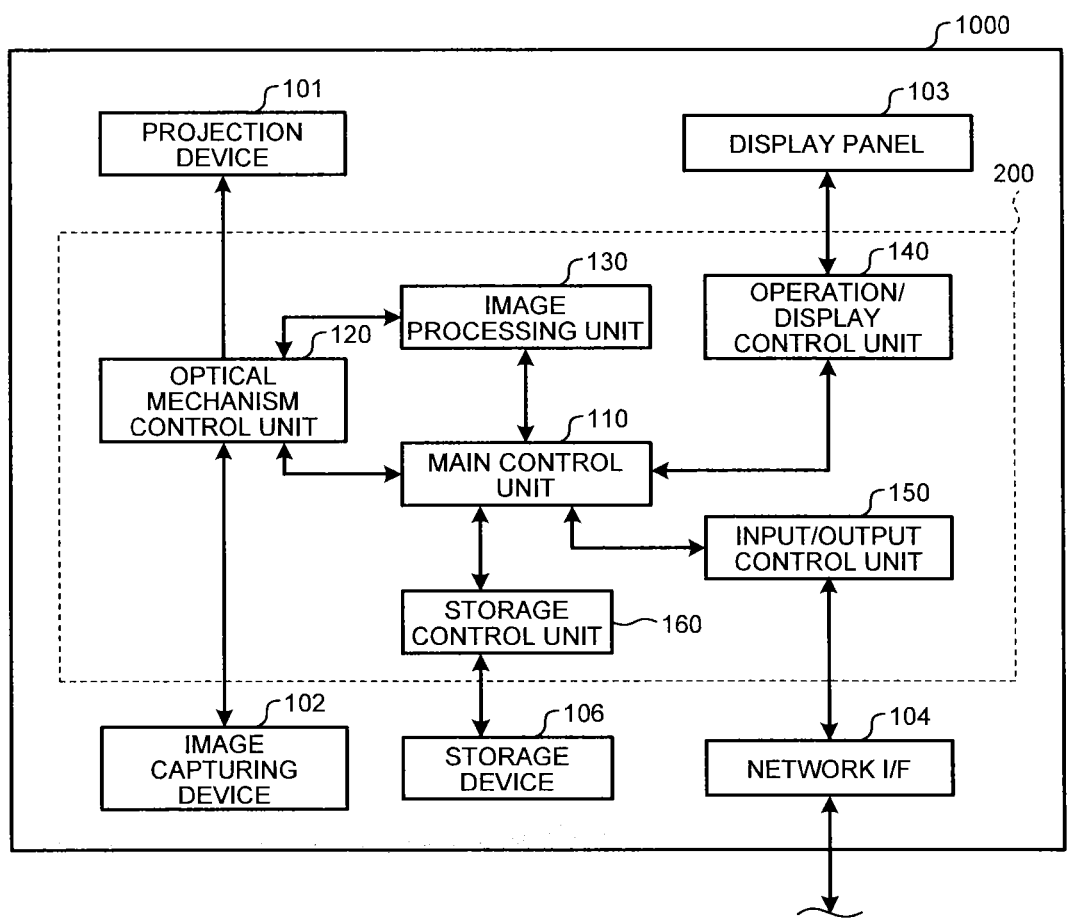
FIG. 18 is a block diagram illustrating a functional configuration example of an image projection display device according to a second embodiment.

FIG. 18 is a block diagram schematically illustrating a functional configuration of an image projection display device 1000 according to the present embodiment. As illustrated in FIG. 18, the image projection display device 1000 according to the present embodiment differs from that of the first embodiment in including a storage control unit 160 and a storage device 106. In this example, the storage control unit 160 is provided in a controller 200.

Under the control of the main control unit 110, the storage control unit 160 stores, in the storage device 106, the stretching speed of the shadow produced on the screen 201 (in the projection area 205) and a height on the projection surface in a manner corresponding to each other. In the present embodiment, the storage device 106 stores second information indicating a predetermined range in the height direction (up-down direction) on the projection surface (which may be information indicating, for example, a predetermined range in the up-down direction in the original image coordinate system) together with each piece of first information indicating the stretching speed of the shadow in a corresponding manner.

In the present embodiment, when having determined that two or more button icons exist on the linear regression line 211, the image processing unit 130 determines the pointed position based on the stretching speed of the shadow 206 produced on the screen 201. More specifically, when having determined that two or more button icons exist on the linear regression line 211, the image processing unit 130 detects the stretching speed of the shadow 206 produced on the screen 201. The image processing unit 130 cart detect the stretching speed of the shadow 206, for example, based on a temporal change of the black pixel group (corresponding to the shadow 206) in the composite image described above. Then, after reading the second information corresponding to the first information indicating the detected speed from the storage device 106, the image processing unit 130 determines the button icon displayed in the range indicated by the read second information, and determines the display position of the determined button icon to be the pointed position.

Figure 19:
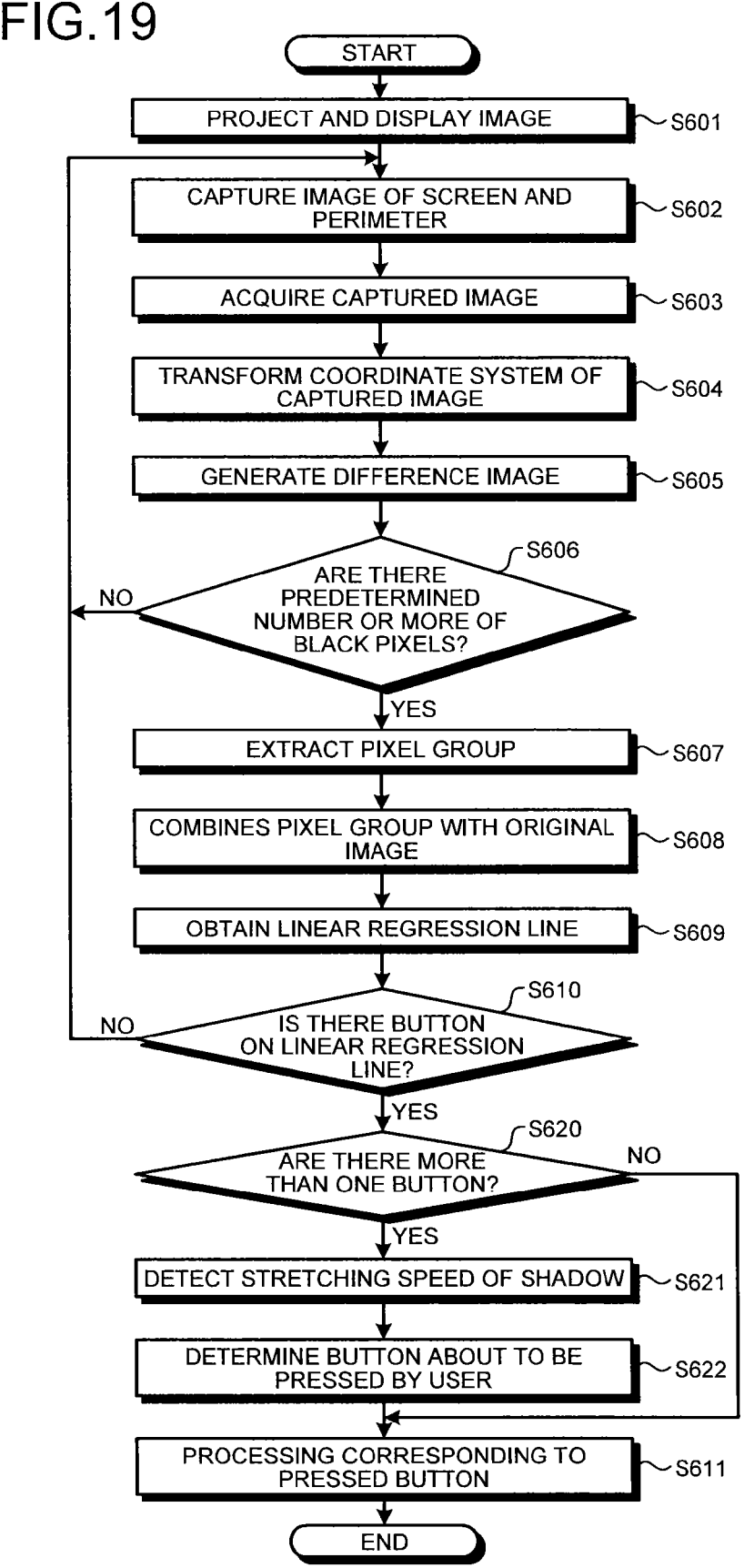
FIG. 19 is a flowchart illustrating an operation example of the image projection display device according to the second embodiment.

FIG. 19 is a flowchart illustrating an operation example of the image projection display device 1000 according to the second embodiment. The processing of Steps from S601 to S610 is the same as that in the first embodiment, and thus will be omitted from description. If having determined, at Step S610, that a button icon exists on the linear regression line 231 in the composite image in the original image coordinate system (Yes at Step S610), the image processing unit 130 determines whether a plurality of button icons exist on the linear regression line 211 (Step S620).

If, at Step S620, it is determined that a plurality of button icons do not exist, that is, only one button icon exists on the linear regression line 211 (No at Step S620), the process proceeds to Step S611. The processing of Step S611 is the same as that in the first embodiment, and thus will be omitted from description.

If, at Step S620, it is determined that a plurality of button icons exist (Yes at Step S620), the image processing unit 130 detects the stretching speed of the shadow 206 produced on the screen 201 (Step S621). The image processing unit 130 can, for example, repeat the process from Step S602 to Step S608 at a predetermined rate, and detect the stretching speed of the shadow 206 produced on the screen 201 based on the temporal change of the black pixel group (corresponding to the shadow 206) in the composite image in the original image coordinate system.

Next, based on the speed of the shadow 206 detected at Stop S621, the image processing unit 130 determines the button icon about to be pressed by the user (Step S622). More specifically, the image processing unit 130 reads, from the storage device 106, the second information corresponding to the first information indicating the speed of the shadow 206 detected at Step S621, and determines, out of the button icons existing on the linear regression line 211, the button icon displayed in the range indicated by the read second information (corresponding to the button icon about to be pressed by the user). Thereafter, the process proceeds to Step S611. The processing of Step S611 is the same as that in the first embodiment, and thus will be omitted from description.

As described above, when having determined that two or more button icons exist on the linear regression line 211, the image processing unit 130 according to the present embodiment determines the button icon about to be pressed by the user based on the stretching speed of the shadow produced on the screen 201. This allows the button icon about to be pressed by the user to be correctly determined even when, for example, the button icons displayed in the image projected on the screen 201 are arranged on a straight line in a direction substantially parallel to the axis 202 of the projected light (in the Y-axis direction).

While the embodiments of the present invention have been described above, the embodiments are presented as examples and are not intended to limit the scope of the invention. The present invention is not limited to the embodiments as they are, but can be put into practice by modifying the constituent elements within the scope that does not depart from the gist of the invention in implementation stages. Moreover, various inventions can be formed by appropriate combination of the constituent elements disclosed in the embodiments. For example, several constituent elements may be deleted from the whole of the constituent elements illustrated on the embodiments.

For example, the image processing unit 130 can determine a flick operation by the user based on the shadow 206 produced on the screen 201 (in the projection area 205). Note that the term "flick" refers to an action of lightly sweeping a finger. For example, The image processing unit 130 can determine that the user has performed the flick operation if the longitudinal length of the black pixel group (corresponding to the shadow 206 produced on the screen 201) in the composite image in the original image coordinate system has a length within a threshold value and also if the black pixel group moves from left to right (or from right to left) over time.

FIG. 20 is a diagram illustrating a state in which the user performs the action of lightly sweeping the finger from left to right relative to the projection area 205. In the example of FIG. 20, when the finger of the user is positioned at "204*g*", a shadow 206*g* is produced in the projection area 205. When the finger of the user is positioned at "204*h*", a shadow 206*h* is produced in the projection area 205. When the finger of the user is positioned at "204*i*", a shadow 206*i* is produced in the projection area 205.

Note that the embodiments and the modification described above can be combined in any desired manner.

The present invention allows a user to perform intuitive operations when the user performs the operations on an image projected on a screen with a low-cost and simple configuration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   circuitry configured to:
   acquire a captured image, obtained by imaging at least one of a projection surface onto which an image is projected so that an optical axis of projected light projected from a projection device and the projection surface form an acute angle, and a perimeter of the projection surface;
   detect, based on the captured image, a shadow produced by an object entering an optical path of the projected light on at least one of the projection surface and the perimeter of the projection surface;
   calculate a linear regression line that indicates an entering direction of the object based on the detected shadow, the linear regression line extending beyond the detected shadow of the object in the entering direction of the object;
   determine, based on information of whether or not a button exists in the image on the calculated linear regression line, whether or not the button is to be pressed; and
   output, when it is determined that the button is to be pressed, information corresponding to pressing of the button, wherein
   a plurality of buttons arranged in positions different from each other are displayed in the image, and
   the circuitry is configured to determine, when having determined that two or more of the plurality of buttons exist on the linear regression line, which one of the two or more of the plurality of buttons is to be pressed based on a stretching speed of the shadow.

2. The image processing apparatus according to claim 1, wherein
   the plurality of buttons are displayed in the image and arranged so as to be located in positions different from each other in a direction parallel to the projection surface and perpendicular to the optical axis of projection, and
   the circuitry is configured to determine, as a pointed position, a position in which the button among the plurality of buttons that is passed through by the linear regression line is displayed.

3. The image processing apparatus according to claim 2, wherein
   the circuitry is configured to acquire the captured image, detect the shadow, and determine whether or not the button exits in the image on the calculated linear regression line at a predetermined rate, and
   when a position in which a same button is displayed has been determined to be the pointed position a plurality of times in a row, the circuitry is configured to output information corresponding to the determined pointed position.

4. The image processing apparatus according to claim 2, wherein, when any of the plurality of buttons corresponds to the pointed position, the circuitry is configured to control the projection device so as to project, instead of the projected image, a new image corresponding to the button that corresponds to the pointed position onto the projection surface.

5. The image processing apparatus according to claim 1, wherein the circuitry is configured to store the stretching speed and a height of the shadow on the projection surface in a manner corresponding to each other in a memory, wherein
   the circuitry is configured to detect, when having determined that the two or more of the plurality of buttons exist on the linear regression line, the stretching speed of the shadow, and determine, as a pointed position, a display position of a corresponding button corresponding to the height that corresponds to the detected stretching speed of the shadow.

6. The image processing apparatus according to claim 1, wherein, when any of the plurality of buttons corresponds to a pointed position, the circuitry is configured to control the projection device so as to project, instead of the projected image, anew image corresponding to a corresponding button that corresponds to the pointed position onto the projection surface.

7. The image processing apparatus according to claim 1, further comprising:
   the projection device; and
   an image capturing device configured to be placed in a position nearer to the projection surface than a projecting part of the projection device, and to capture at least one of the projection surface and the perimeter of the projection surface.

8. The image processing apparatus according to claim 1, wherein the circuitry is configured to detect the shadow produced by light emitted from a light source that irradiates the perimeter of the projection surface with a certain quantity of light.

9. The image processing apparatus according to claim 8, further comprising the light source.

10. A non-transitory computer-readable recording medium that contains an image processing program that comprises instructions for executing:
    a step of acquiring a captured image, obtained by imaging at least one of a projection surface onto which an image is projected so that an optical axis of projected light projected from a projection device and the projection surface form an acute angle, and a perimeter of the projection surface;
    a step of detecting, based on the captured image, a shadow produced by an object entering an optical path of the projected light on at least one of the projection surface and the perimeter of the projection surface;
    a step of calculating a linear regression line that indicates an entering direction of the object based on the detected shadow, the linear regression line extending beyond the detected shadow of the object in the entering direction of the object;

a step of determining, based on information of whether or not a button exists in the image on the calculated linear regression line, whether or not the button is to be pressed; and a step of outputting, when it is determined that the button is to be pressed, information corresponding to pressing of the button, wherein a plurality of buttons arranged in positions different from each other are displayed in the image, and when two or more of the plurality of buttons exist on the linear regression line, which one of the two or more of the plurality of buttons is to be pressed is determined based on a stretching speed of the shadow.

11. An image processing method comprising:

acquiring a captured image, obtained by imaging at least one of a projection surface onto which an image is projected so that an optical axis of projected light projected from a projection device and the projection surface form an acute angle, and a perimeter of the projection surface;

detecting, based on the captured image, a shadow produced by an object entering an optical path of the projected light on at least one of the projection surface, and the perimeter of the projection surface;

calculating a linear regression line that indicates an entering direction of the object based on the detected shadow, the linear regression line extending beyond the detected shadow of the object in the entering direction of the object;

determining, based on information of whether or not a button exists in the image on the calculated linear regression line, whether or not the button is to be pressed; and outputting, when it is determined that the button is to be pressed, information corresponding to pressing of the button, wherein a plurality of buttons arranged in positions different from each other are displayed in the image, and when two or more of the plurality of buttons exist on the linear regression line, which one of the two or more of the plurality of buttons is to be pressed is determined based on a stretching speed of the shadow.

* * * * *